(12) United States Patent
Soelberg et al.

(10) Patent No.: US 12,115,442 B2
(45) Date of Patent: *Oct. 15, 2024

(54) METHOD AND APPARATUS FOR ADAPTING TO GAMING VENUE STATES

(71) Applicant: STEELSERIES ApS, Copenhagen SV (DK)

(72) Inventors: Tino Soelberg, Chicago, IL (US); Michael Aronzon, Vaughan (CA)

(73) Assignee: STEELSERIES ApS (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,533

(22) Filed: Oct. 4, 2023

(65) Prior Publication Data

US 2024/0024763 A1     Jan. 25, 2024

Related U.S. Application Data

(63) Continuation of application No. 17/590,086, filed on Feb. 1, 2022, now Pat. No. 11,806,611, which is a
(Continued)

(51) Int. Cl.
*A63F 13/22*     (2014.01)
*A63F 13/2145*     (2014.01)
*A63F 13/79*     (2014.01)

(52) U.S. Cl.
CPC .......... *A63F 13/22* (2014.09); *A63F 13/2145* (2014.09); *A63F 13/79* (2014.09); *A63F 2300/1018* (2013.01); *A63F 2300/1025* (2013.01); *A63F 2300/1075* (2013.01); *A63F 2300/208* (2013.01); *A63F 2300/403* (2013.01)

(58) Field of Classification Search
CPC ...... A63F 13/22; A63F 13/2145; A63F 13/79; A63F 2300/1018; A63F 2300/1025; A63F 2300/1075; A63F 2300/208; A63F 2300/403

See application file for complete search history.

(56) References Cited

U.S. PATENT DOCUMENTS

| | | | |
|---|---|---|---|
| 7,369,117 B2 * | 5/2008 | Evans | G06F 3/0238 710/72 |
| 7,765,493 B2 | 7/2010 | Chickles et al. | |

(Continued)

OTHER PUBLICATIONS

Corning Incorporated, "A Day Made of Glass . . . Made Possible by Corning", http:www.youtube.com/watch?v=6Cf7IL_eZ38; pp. 1-2; Website last visited Jun. 23, 2011.

(Continued)

*Primary Examiner* — Jasson H Yoo
(74) *Attorney, Agent, or Firm* — Guntin & Gust, PLC; Mark Wilinski

(57) ABSTRACT

A system that incorporates teachings of the present disclosure may include, for example, a method for detecting that a gaming system has presented a first of a plurality of gaming venue states of a game, presenting a first of a plurality of screen shots at a display responsive to detecting the first gaming venue state, detecting that the gaming system has transitioned to a presentation of a second of the plurality of venue states, and presenting a second of the plurality of screen shots at the display responsive to detecting the second gaming venue state. Additional embodiments are disclosed.

20 Claims, 12 Drawing Sheets

Related U.S. Application Data continuation of application No. 17/079,779, filed on Oct. 26, 2020, now Pat. No. 11,266,905, which is a continuation of application No. 16/209,430, filed on Dec. 4, 2018, now Pat. No. 10,850,189, which is a continuation of application No. 15/639,697, filed on Jun. 30, 2017, now Pat. No. 10,179,279, which is a continuation of application No. 14/040,221, filed on Sep. 27, 2013, now Pat. No. 9,731,195, which is a continuation of application No. 13/210,857, filed on Aug. 16, 2011, now Pat. No. 8,562,435.

(56) References Cited

U.S. PATENT DOCUMENTS

| | | | |
|---|---|---|---|
| 8,562,435 | B2 | 10/2013 | Soelberg et al. |
| 9,329,767 | B1 | 5/2016 | Teller et al. |
| 9,731,195 | B2 | 8/2017 | Soelberg et al. |
| 10,850,189 | B2 | 12/2020 | Soelberg et al. |
| 11,266,905 | B2 | 3/2022 | Soelberg et al. |
| 2001/0035859 | A1 | 11/2001 | Kiser et al. |
| 2009/0183098 | A1 | 7/2009 | Casparian et al. |
| 2009/0233718 | A1 | 9/2009 | Shelton |
| 2009/0284476 | A1 | 11/2009 | Bull et al. |
| 2010/0281410 | A1* | 11/2010 | Heintze .............. G06F 3/0202 715/846 |
| 2011/0021269 | A1 | 1/2011 | Wolff-Peterson et al. |
| 2011/0034248 | A1* | 2/2011 | Grever ................. A63F 13/73 463/43 |
| 2012/0169613 | A1 | 7/2012 | Armstrong et al. |
| 2017/0296914 | A1 | 10/2017 | Soelberg et al. |
| 2019/0105560 | A1 | 4/2019 | Soelberg et al. |
| 2021/0038976 | A1 | 2/2021 | Soelberg et al. |
| 2022/0152480 | A1 | 5/2022 | Soelberg et al. |

OTHER PUBLICATIONS

Muruzono, "2019—A Beatiful Illustration of Future Technology—From Microsoft", http://www.youtube.com/watch?v=SQu5zRmqa_E; pp. 1-2; Website last visited Jun. 23, 2011.

Resident Brett, "WiiU—E3 2011 Announcement + Trailer", http://www.youtube.com/watch?v=eniBUtc4Uws; pp. 1-2; Website last visited Jun. 23, 2011.

* cited by examiner

200

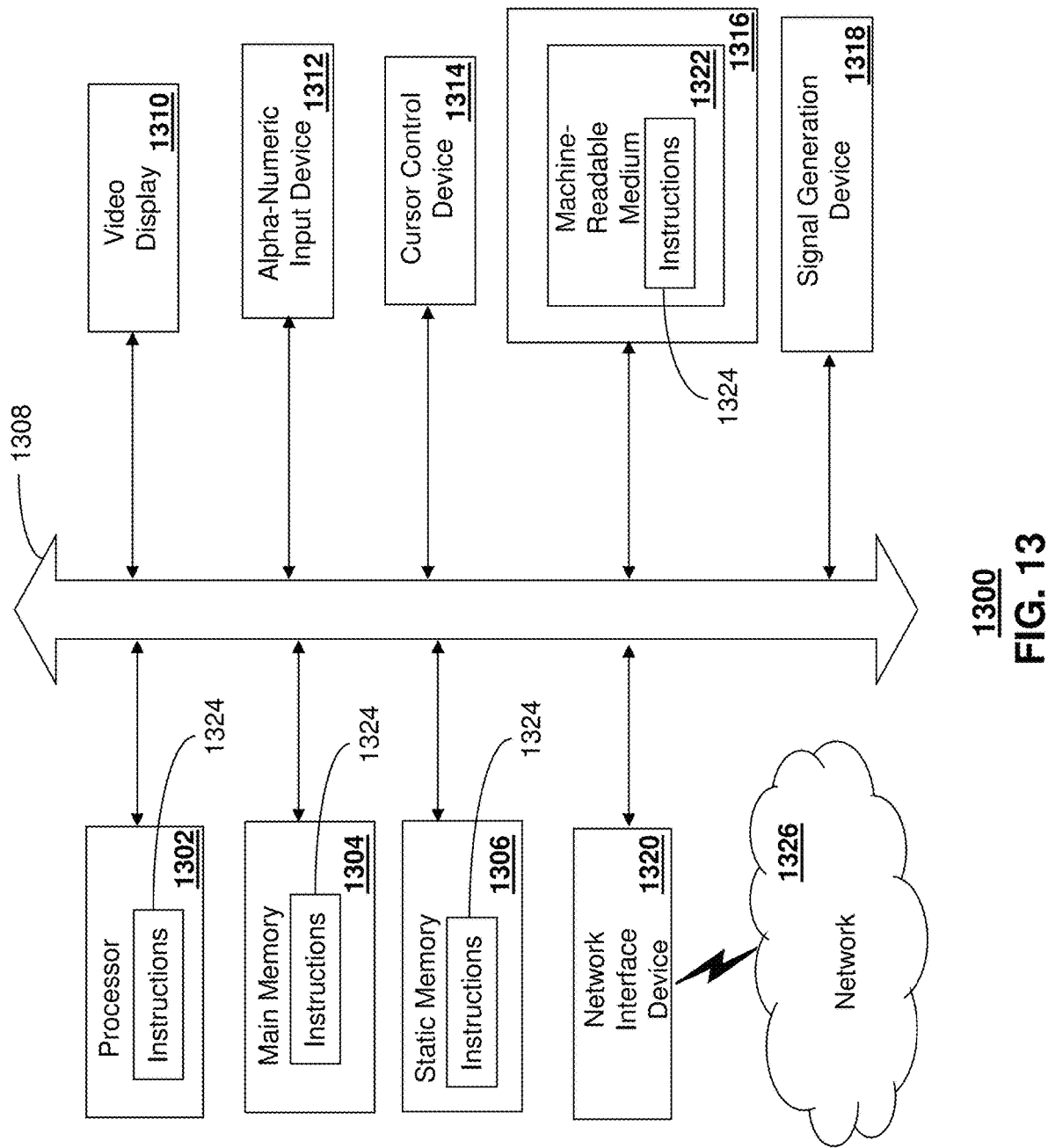

METHOD AND APPARATUS FOR ADAPTING TO GAMING VENUE STATES

CROSS-REFERENCE TO RELATED APPLICATIONS

This application is a continuation of U.S. patent application Ser. No. 17/590,086, filed Feb. 1, 2022, which is a continuation of U.S. patent application Ser. No. 17/079,779, filed Oct. 26, 2020 (Now U.S. Pat. No. 11,266,905), which is a continuation of U.S. patent application Ser. No. 16/209,430, filed Dec. 4, 2018 (Now U.S. Pat. No. 10,850,189), which is a continuation of U.S. patent application Ser. No. 15/639,697, filed Jun. 30, 2017 (Now U.S. Pat. No. 10,179,279), which is a continuation of U.S. patent application Ser. No. 14/040,221, filed Sep. 27, 2013 (Now U.S. Pat. No. 9,731,195), which is a continuation and U.S. patent application Ser. No. 13/210,857, filed Aug. 16, 2011 (Now U.S. Pat. No. 8,562,435). All sections of the aforementioned application(s) and patent(s) are incorporated herein by reference in their entirety.

FIELD OF THE DISCLOSURE

The present disclosure relates generally to a method and apparatus for adapting to gaming venue states.

BACKGROUND

It is common today for gamers to utilize more than one gaming accessory. This is especially true of gamers who play Massively Multiplayer On-line (MMO) games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to gamers.

BRIEF DESCRIPTION OF THE DRAWINGS

FIG. 13 depicts an illustrative diagrammatic representation of a machine in the form of a computer system within which a set of instructions, when executed, may cause the machine to perform any one or more of the methodologies disclosed herein.

DETAILED DESCRIPTION

Figure 1:
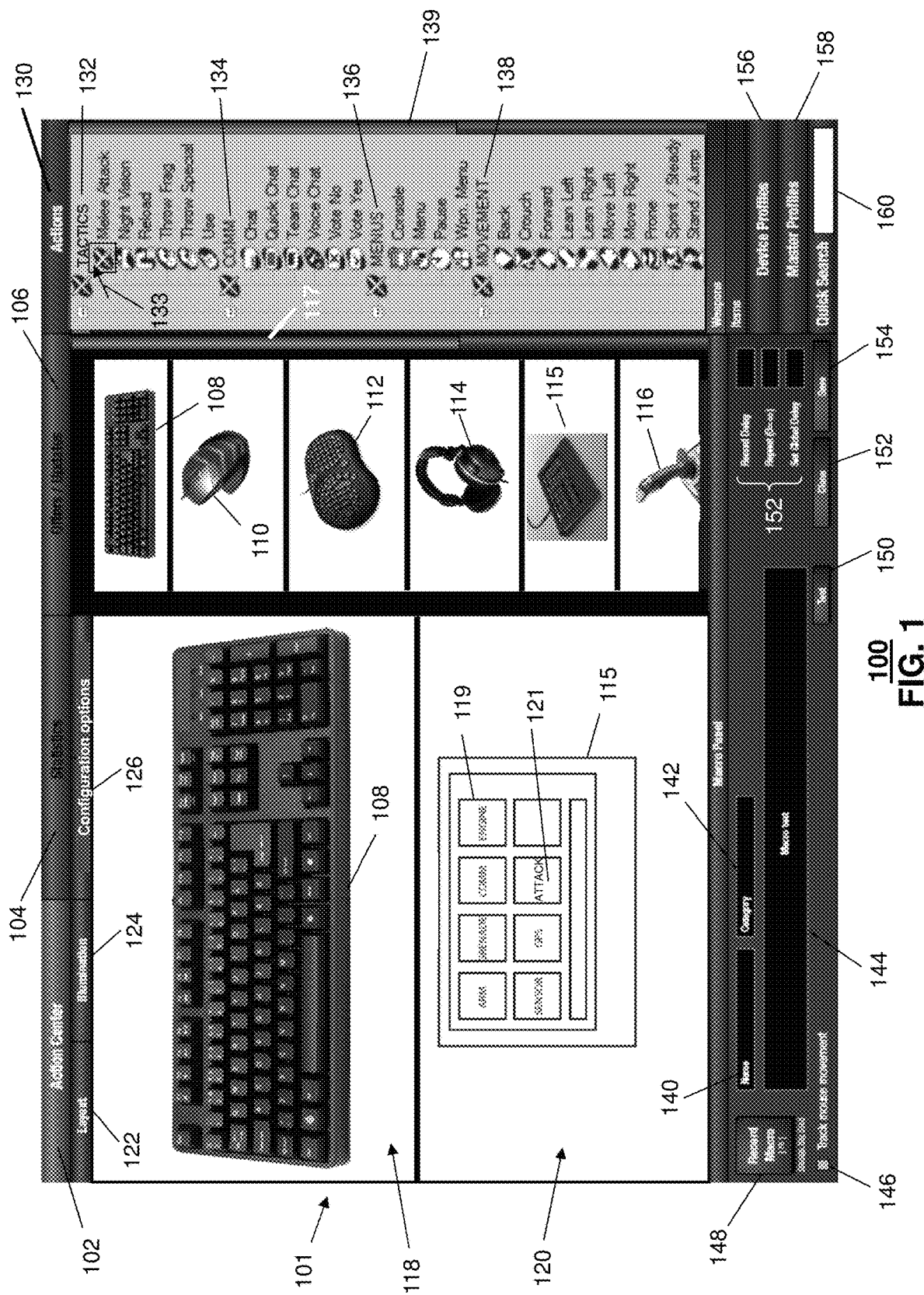
FIG. 1 depicts an illustrative embodiment of a Graphical User Interface (GUI) generated by an Accessory Management Software (AMS) application according to the present disclosure.

One embodiment of the present disclosure can entail an apparatus having a memory coupled to a controller. The controller can be operable to identify a plurality of screen shots, where each screen shot comprising a plurality of selectable elements for presentation at a touch screen display, and where each selectable element when selected by way of the touch screen display generates a stimulation. The controller can also be operable to associate at least a portion of the stimulations generated when selecting the plurality of selectable elements with one or more substitute accessory stimulations, associate the plurality of screen shots with a plurality of gaming venue states, and record the plurality of screen shots and the associations with the plurality of gaming venue states and the one or more substitute accessory stimulations. The controller can be further operable to establish communications with a video gaming system that is engaged in presenting a video game, detect that the video gaming system has presented a first of the plurality of gaming venue states, identify a first of the plurality of screen shots associated with the first gaming venue state, and present the first screen shot at the touch screen display. The controller can also be operable to receive from the touch screen display a first stimulation responsive to a selection of one of the plurality of selectable elements of the first screen shot, detect a recorded association between the first stimulation and a first of one or more substitute accessory stimulations, and transmit the first of the one or more substitute accessory stimulations to the video gaming system to control a presentation of the video game.

One embodiment of the present disclosure can entail a computer-readable storage medium having computer instructions to detect that a video gaming system has presented a first of a plurality of gaming venue states of a video game, identify a first of a plurality of screen shots associated with the first gaming venue state, and present the first screen shot at a touch screen display. The storage medium can also have computer instructions to receive from the touch screen display a first stimulation responsive to a selection of one of a plurality of selectable elements of the first screen shot, detect an association between the first stimulation and a first of one or more substitute stimulations, and transmit the first of the one or more substitute stimulations to the video gaming system to control a presentation of the video game.

One embodiment of the present disclosure can entail a method for detecting that a gaming system has presented a first of a plurality of gaming venue states of a game, presenting a first of a plurality of screen shots at a touch screen display responsive to detecting the first gaming venue state, detecting that the gaming system has transitioned to a presentation of a second of the plurality of venue states, and presenting a second of the plurality of screen shots at the touch screen display responsive to detecting the second gaming venue state. The first screen shot can have a first plurality of selectable elements for presentation at the touch screen display, where each selectable element of the first screen shot when selected by way of the touch screen display generates a first of a plurality of stimulations for controlling operations of the game. The second screen shot can have a second plurality of selectable elements for presentation at the touch screen display, where each selectable element of the second screen shot when selected by way of the touch screen display generates a second of the plurality of stimulations for controlling operations of the game.

Figure 5:
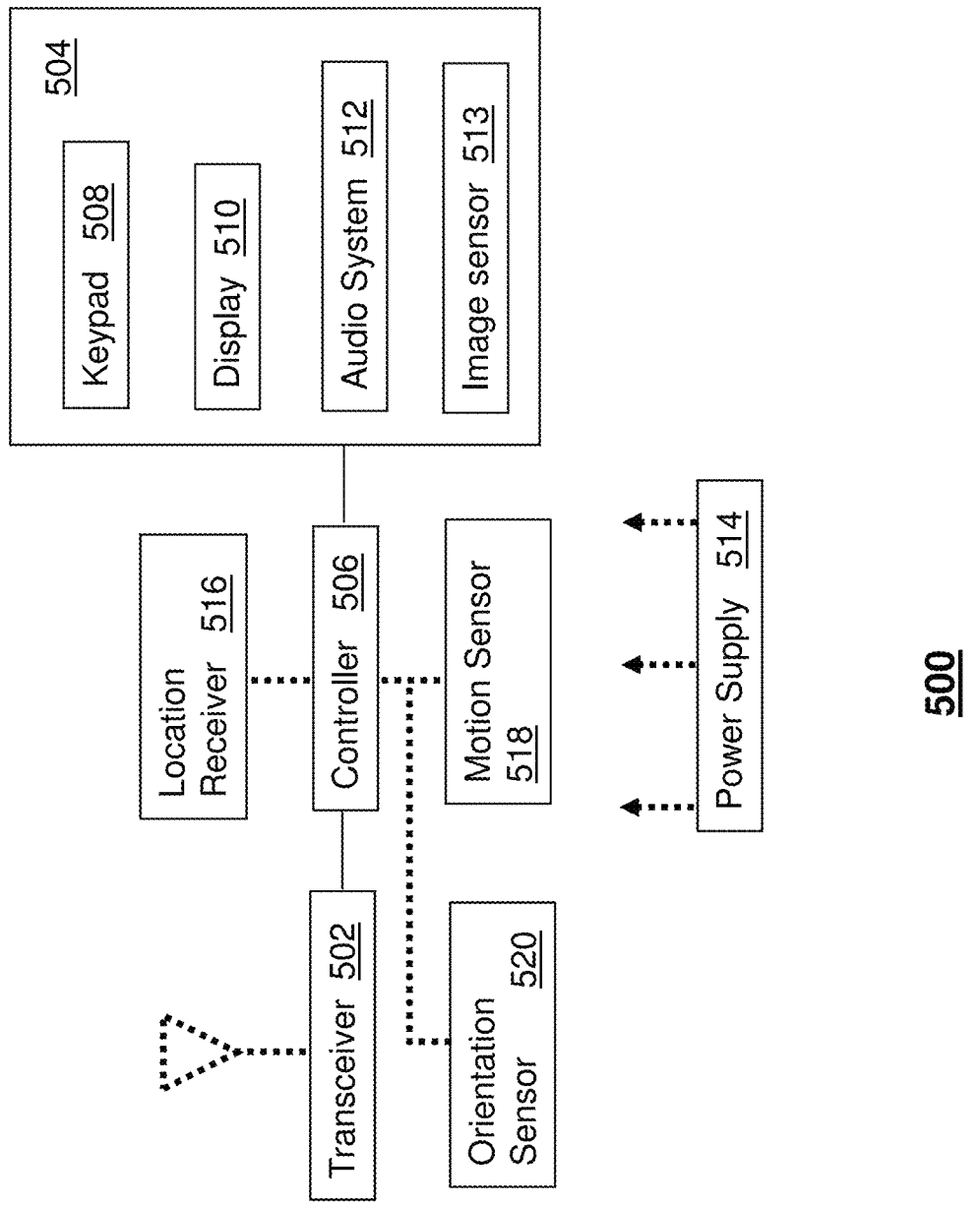
FIG. 5 depicts an illustrative embodiment of a block diagram of a communication device.
Figure 6:
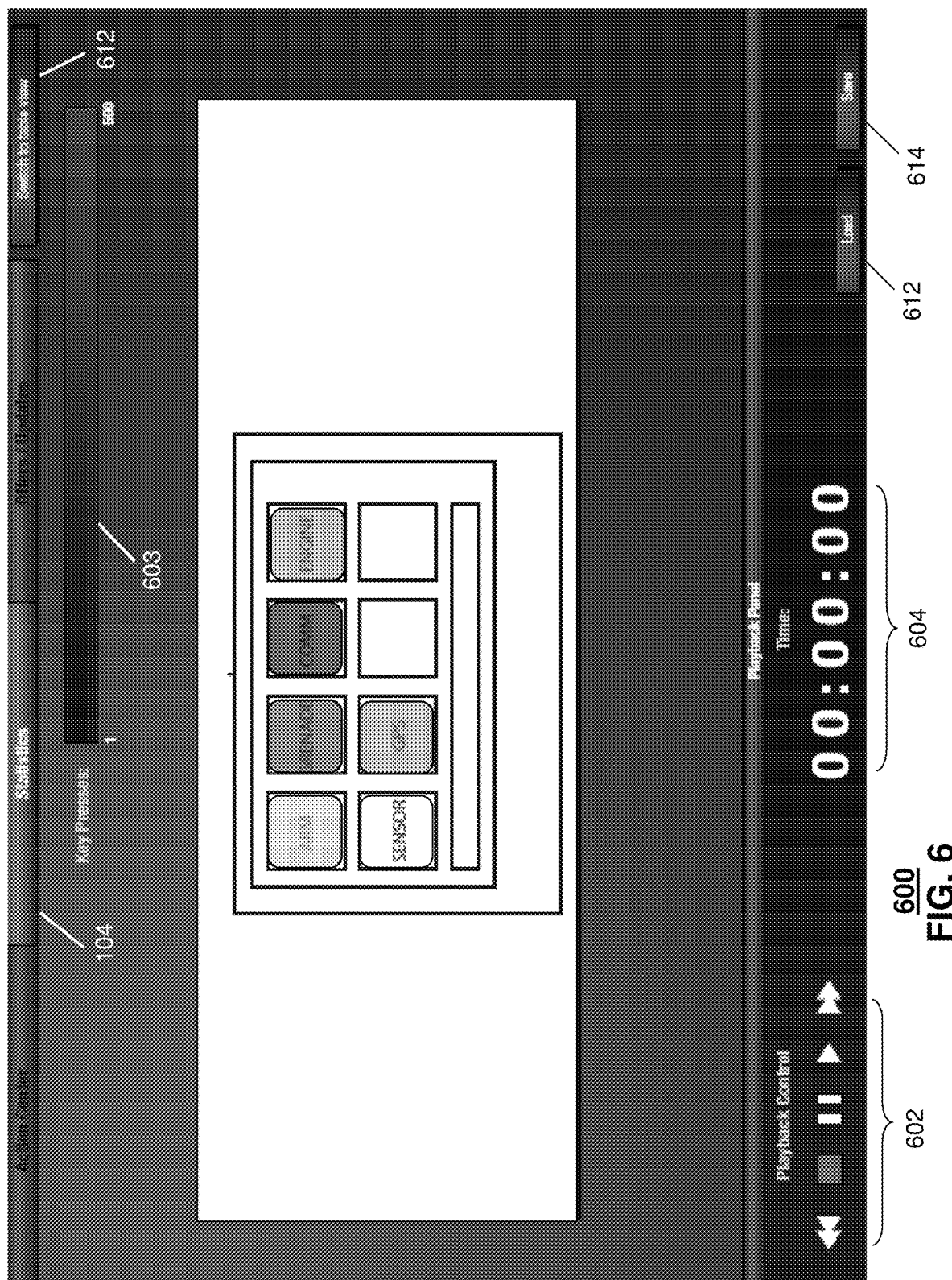
FIGS. 6-7 depict illustrative embodiments of the GUI of FIG. 1.

FIGS. 1, 5 and 6 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, a gaming console, a gaming accessory, or combinations thereof. The AMS application can also operate in other computing devices with computing resources such as a cellular phone, a personal digital assistant, or a media player (such as an iPOD™). From these illustrations it is contemplated that the AMS application can operate in any device with suitable computing resources.

Figure 2:
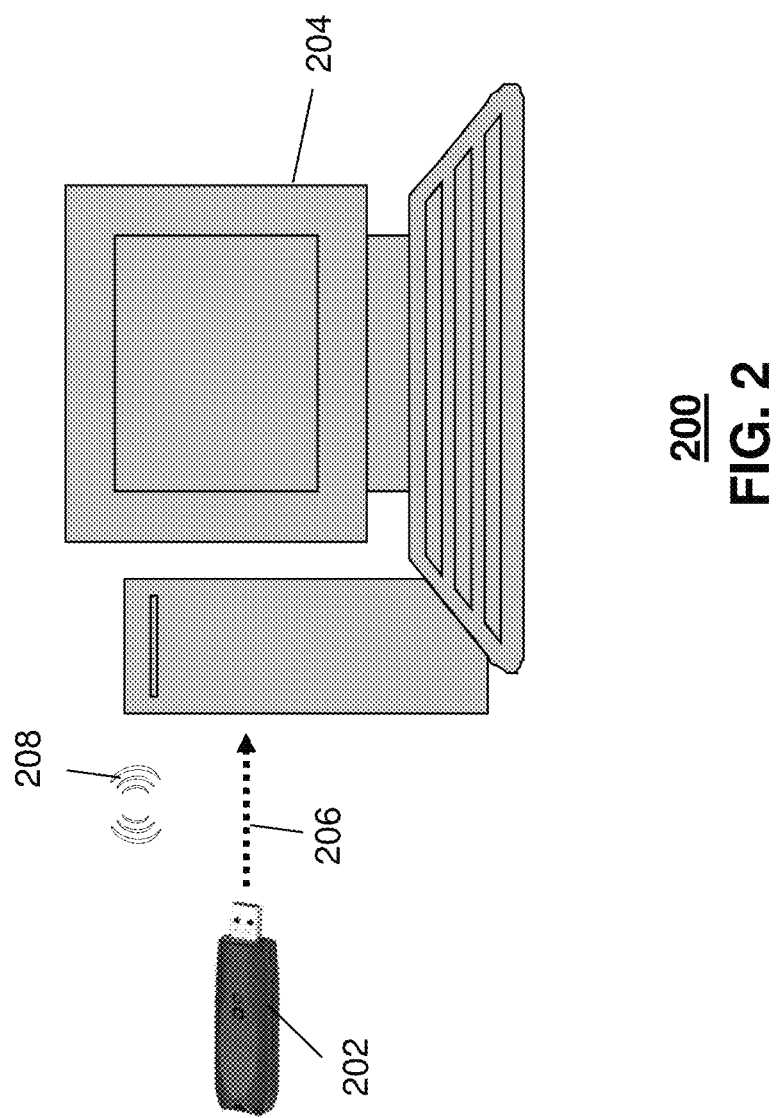
FIG. 2 depicts an embodiment for programming an apparatus with the AMS application.
Figure 3:
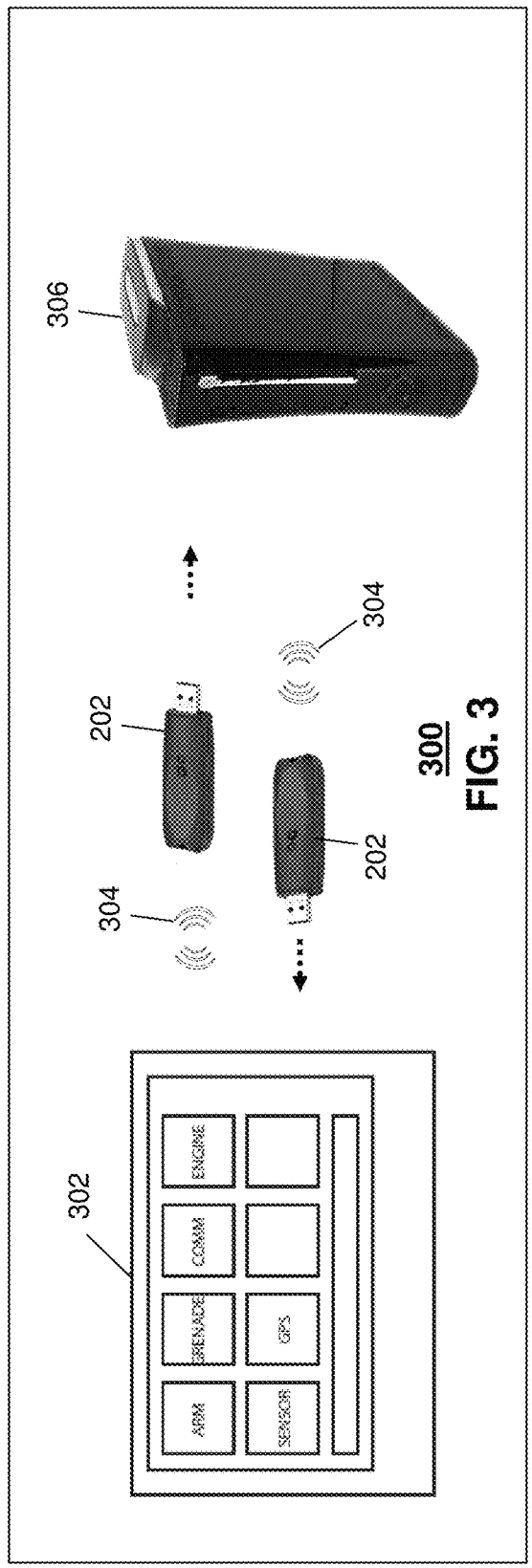
FIG. 3 depicts illustrative embodiments for utilizing the apparatus.

FIGS. 2-3 depict a portable apparatus 202 programmable by the AMS application. FIG. 2 depicts an illustration of how the portable apparatus 202 can be programmed. In this illustration, the portable apparatus can take the form of a Universal Serial Bus (USB) dongle (herein referred to as dongle 202). The dongle 202 can be communicatively coupled to a computer 204 by a physical interface 206 such as a USB port or wireless interface 208 such as Bluetooth or Wireless Fidelity (WiFi). The computer 204 can be used to execute operations of the AMS application. In this configuration, the AMS application can be directed to generate associations between accessory stimuli and input functions of accessories which can be programmed in the dongle 202 as will be described below.

Figure 4:
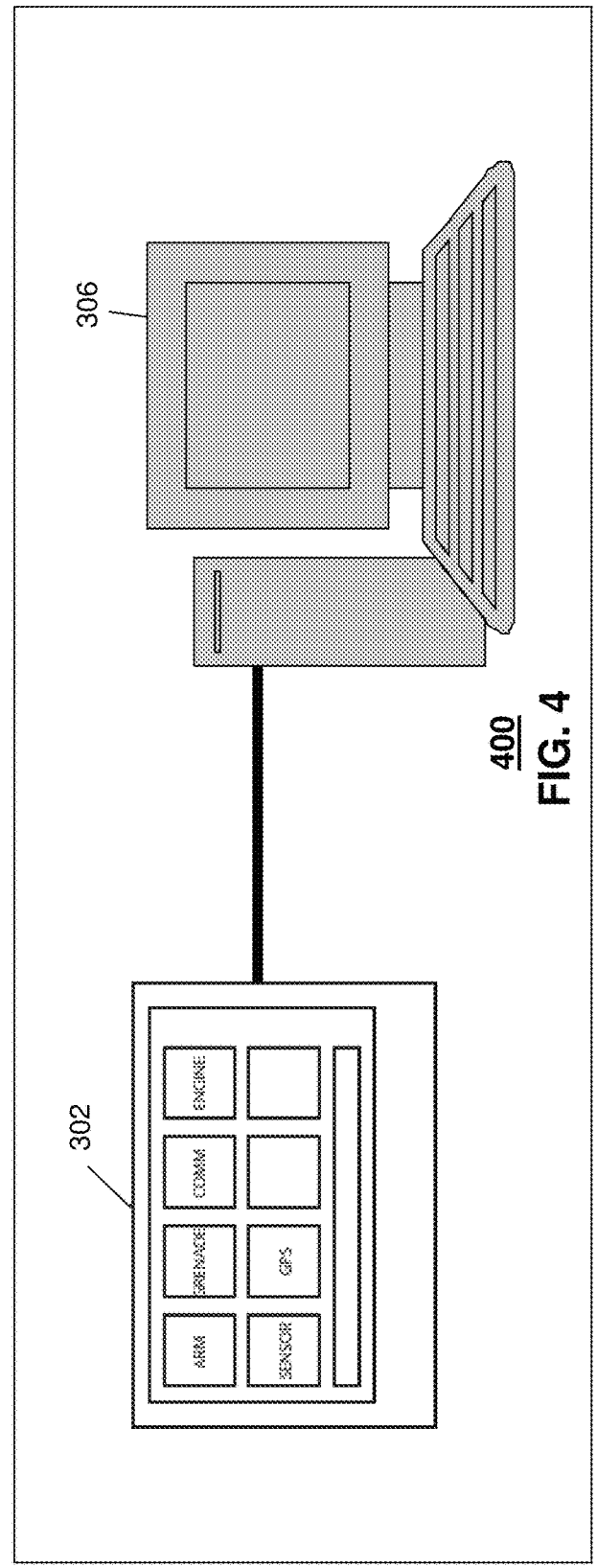
FIG. 4 depicts an embodiment without the use of the apparatus.

FIG. 3 illustrates a number of embodiments for utilizing the dongle 202 with a gaming accessory 302 (in this illustration a touch screen display tablet, herein referred to as tablet 302) and a computing device 306 such as a gaming console or a computer capable of presenting gaming application (herein referred to as gaming console 306). In the illustration of FIG. 3, the USB portion of the dongle 202 can be physically engaged with either the tablet 302 or the gaming console 306. The dongle 202 in either of these configurations can communicate with the tablet 302 or the gaming console 306 by wireless means 304 (e.g., WiFi or Bluetooth). Other embodiments of the dongle 202 are contemplated. For instance, the functions in whole or in part of the dongle 202 can be an integral part of the tablet 302 and/or the gaming console 304. In FIG. 4, the tablet 302 can alternatively be tethered to the gaming console 304 by cable (e.g., USB cable) to provide a means of communication less susceptible to electromagnetic interference or other sources of wireless interferences.

FIG. 5 depicts an illustrative embodiment of a communication device 500. Communication device 500 can serve in whole or in part as an illustrative embodiment of the devices depicted in FIGS. 1-4. The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500.

In an embodiment where the display 510 is touch-sensitive, a portion or all of the keypad 508 can be presented by way of the display 510 with navigation features. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used control the manipulation of the GUI elements.

The UI 504 can also include an audio system 512 that utilizes common audio technology for conveying low volume audio (such as audio heard only in the proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and charging system technologies for supplying energy to the components of the communication device 500 to facilitate long-range or short-range portable applications. Alternatively, the charging system can utilize external power sources such as DC power supplied over a physical interface such as a USB port.

The location receiver 516 can utilize location technology such as a global positioning system (GPS) receiver capable of assisted GPS for identifying a location of the communication device 500 based on signals generated by a constellation of GPS satellites, thereby facilitating common location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a compass to detect the orientation of the communication device 500 (North, South, West, East, combined orientations thereof in degrees, minutes, or other suitable orientation metrics).

The communication device 500 can use the transceiver 502 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 506 can utilize computing technologies such as a microprocessor, a digital signal processor (DSP), and/or a video processor with associated storage memory such as Flash, ROM, RAM, SRAM, DRAM or other storage technologies.

Other components not shown in FIG. 5 are contemplated by the present disclosure. For instance, the communication device 500 can include a reset button (not shown). The reset button can be used to reset the controller 506 of the communication device 500. In yet another embodiment, the communication device 500 can also include a factory default setting button positioned below a small hole in a housing assembly of the communication device 500 to force the communication device 500 to re-establish factory settings. In this embodiment, a user can use a protruding object such as a pen or paper clip tip to reach into the hole and depress the default setting button.

The communication device 500 as described herein can operate with more or less components described in FIG. 5. These variant embodiments are contemplated by the present disclosure.

Figure 8:
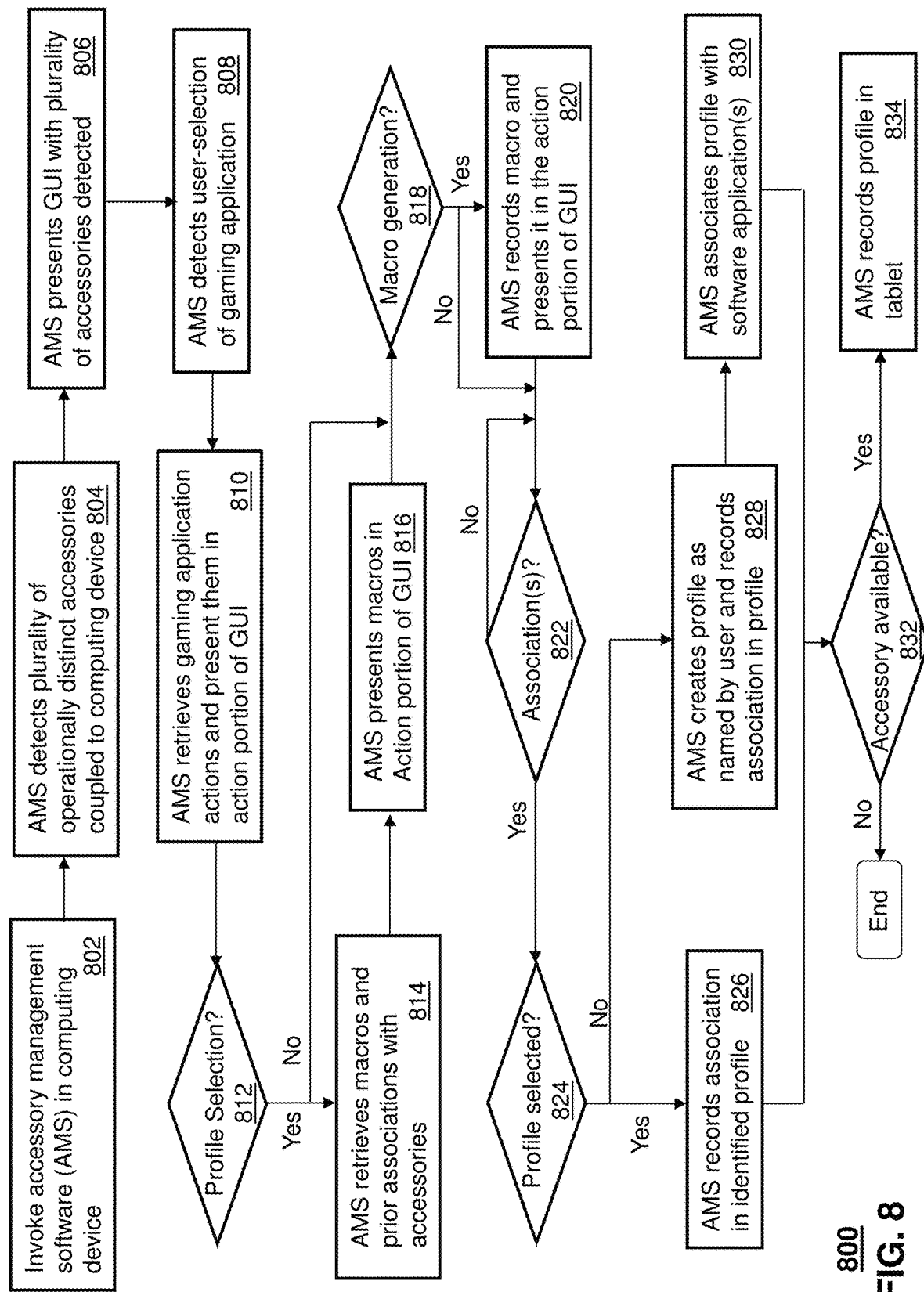
FIGS. 8-10 depict illustrative methods describing the operation of the AMS application.
Figure 9:
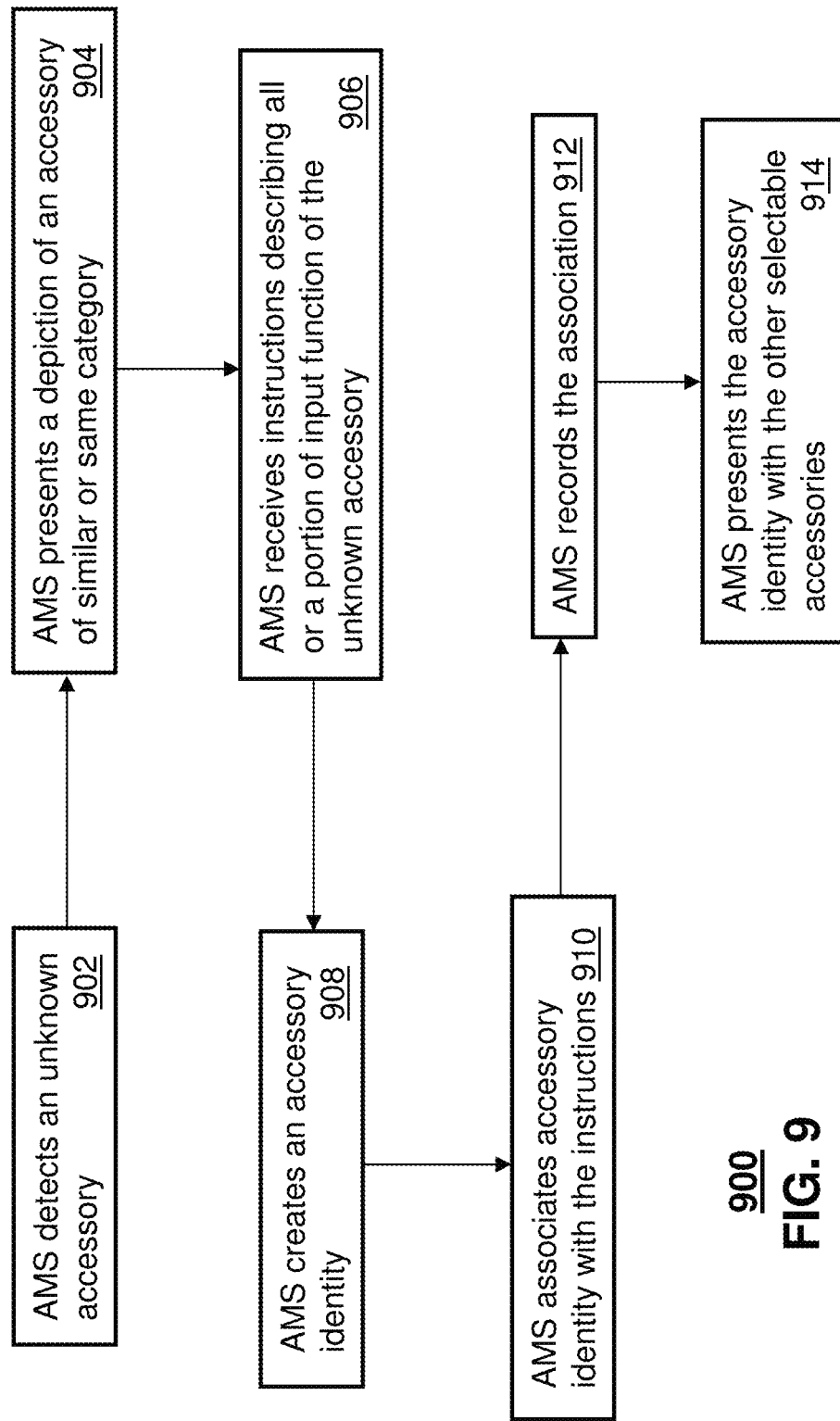
Figure 10:
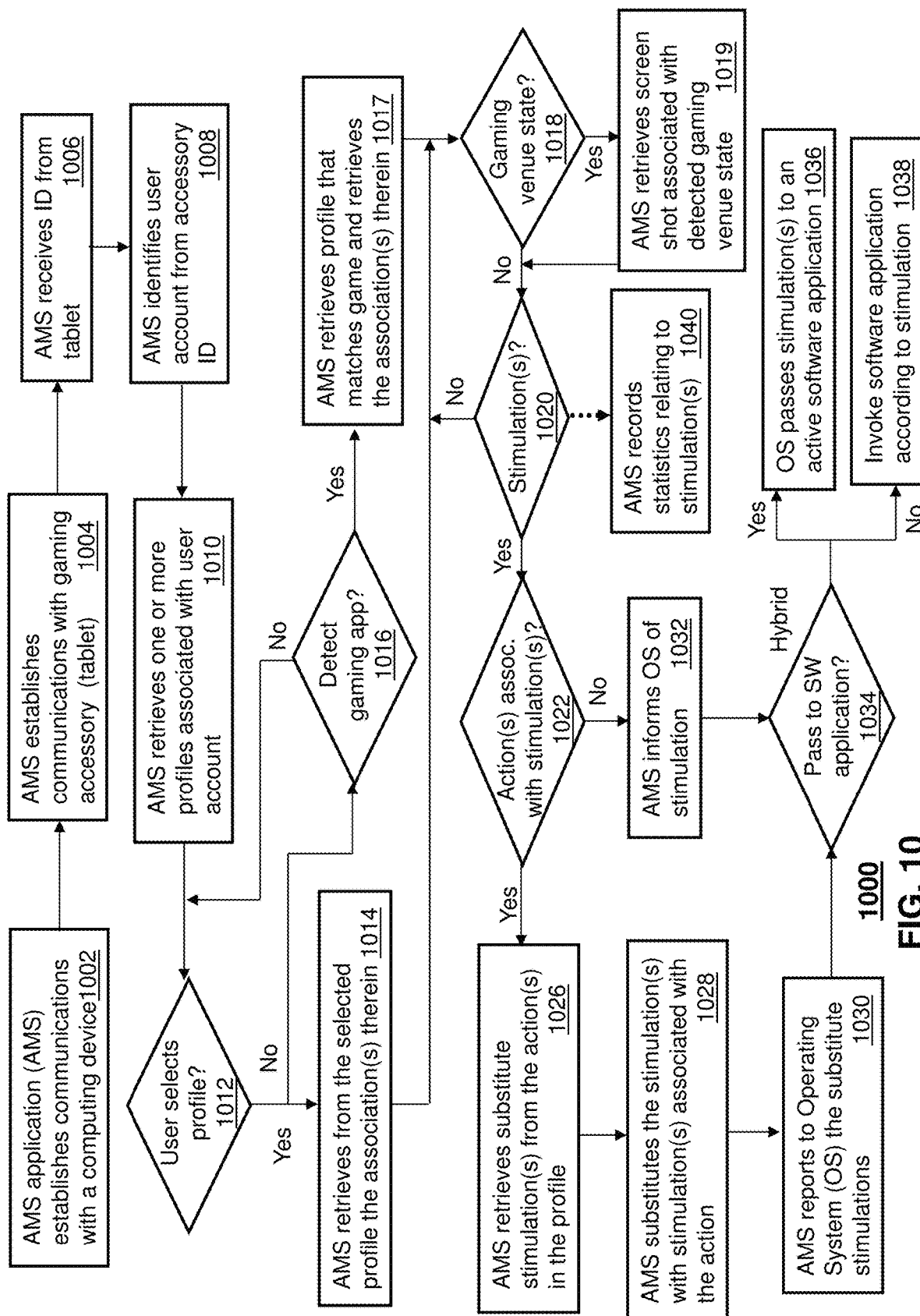

FIGS. 8-10 depict illustrative methods 800-1000 describing the operation of the AMS application and the apparatus 202. Method 800 can begin with step 802 in which the AMS application is invoked in a computing device. The computing device can be the gaming console 306 and the tablet 302 of FIGS. 3 and 4, or any other suitable computing device that can interact or execute a gaming application such as a video game. The invocation step can result from a user selection of the AMS application from a menu or iconic symbol presented on a desktop of the computing device by an operating system (OS) managing operations thereof. In step 804, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a mouse, a gaming console controller, a joystick, a microphone, or a headset with a microphone—just to mention a few. The keyboard and touch screen display represent accessories of a similar category since their operational parameters are alike.

A mouse, on the other hand, represents an accessory having disparate operational parameters from the keyboard or touch screen display. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories.

In step 806, the AMS application presents a GUI 101 such as depicted in FIG. 1 with operationally distinct accessories such as the keyboard 108 and touch screen display 115. The GUI 101 presents the accessories 108-116 in a scrollable section 117. One or more accessories can be selected by a user with a common mouse pointer. In this illustration, the keyboard 108 and touch screen display 115 were selected with a mouse pointer for customization. Upon selecting the keyboard 108 and the touch screen display 115 in section 117, the AMS application presents the keyboard 108 and touch screen display 115 in split windows 118, 120, respectively, to help the user during the customization process.

In step 808, the AMS application can be programmed to detect a user-selection of a particular software application such as a game. This step can be the result of the user entering in a Quick Search field 160 the name of a gaming application (e.g., World of Warcraft™). Upon identifying a gaming application, the AMS application can retrieve in step 810 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable GUI elements 119 of the touch screen display 115 to make an association with an input function of one of these accessories. Actions of one accessory can be associated with another accessory that is of a different category. For example, actions of a mouse or keyboard can be associated with selectable GUI elements 119 of the touch screen display 115.

The selectable GUI elements 119 can also be customized by the AMS application. For example, GUI elements 119 can be created with rectangular, square, circular, oval or other geometric shapes. Each GUI element 119 can be given a name, and/or a symbol or thumbnail can be enclosed in the shape of the GUI element 119. The association of actions 130 with the GUI elements 119 can be performed by the drag and drop operations described above.

The AMS application can also be operable to store a plurality of screen shots of the GUI elements 119 of the touch screen display 115. Each screen shot can represent a set of selectable GUI elements 119 which are appropriate for a specific gaming venue state of a game (such as a video game). A video game can have a plurality of gaming venue states. A gaming venue state can represent a state in which the avatar of a gamer has jumped into a tank. In this gaming venue state, the screen shot for tank controls would be appropriate for presentation at the touch screen display 115. Suppose that the gamer chooses to direct the avatar to leave the tank and proceed on foot to another location. This can represent yet another gaming venue state. In this state, a screen shot with GUI elements for carry-on weapons, ammunition, and other gaming aspects would be useful to the player. Suppose next that the gamer directs the avatar to enter a helicopter. This can represent another gaming venue state. In this state, a screen shot with GUI elements for controlling operations of the helicopter would be useful to the gamer.

Each of these screen shots can be created by manual customization as directed by the gamer when creating GUI elements using the AMS application as described above. Alternatively, or in combination, the GUI elements can be supplied by the author of the gaming application via an Internet download request, information provided on a gaming CD, or screen shots provided while the gaming application is in operation. It should be further noted that the GUI elements in some instances may not be selectable, but rather informative. For example, the GUI elements can be used to describe a gamer's health (e.g., health of the avatar) by a color spectrum. A GUI element can be also used to show a portion of the game as static images (e.g., map with indications of where the enemy may be), or moving images (e.g., video portions of the game).

Each of the screen shots can be associated with gaming venue states and actions from the Action menu 130. For example, the user can drag the Melee Attack symbol to the "Attack" touch screen button of the touch screen display 115 thereby causing an association between the selection of the "Attack" button and the gaming action of a Melee Attack. When the "Attack" button of the touch screen display 115 is selected during normal operation, the AMS application can detect the selection as a "trigger" to generate the key sequence "Ctrl A" which is understood by the gaming application as a request for a Melee Attack. The gaming application operating in the gaming console 306 receives the "Ctrl A" sequence as if it had been generated by a QWERTY keyboard.

With this in mind, attention is directed to step 812 where the AMS application can respond to a user selection of a profile. A profile can be a device profile or master profile invoked by selecting GUI button 156 or 158, each of which can identify the association of actions with input functions of one or more accessories. If a profile selection is detected in step 812, the AMS application can retrieve in step 814 macro(s) and/or prior associations of actions with the accessories as defined by the profile. The actions and/or macros defined in the profile can also be presented in step 816 by the AMS application in the actions column 130 of the GUI 101 to modify or create new associations.

In step 818, the AMS application can also respond to a user selection to create a macro. A macro in the present context can mean any actionable command which can be recorded by the AMS application. An actionable command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, or a mouse pad, and so on. Macros can also be combinations of the above illustrations. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, GUI element 119, etc.) and/or by manual entry in field 144 (e.g., typing the name and location of a software application to be initiated by an OS, such as an instant messaging application). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 820. The recording step can be combined with a step for adding the macro to the associable items Actions column 130, thereby providing the user the means to associate the macro with input functions of the accessories (e.g., one or more keys of the keyboard 108, and one or more GUI elements 119 of the touch screen display).

In step 822, the AMS application can respond to drag and drop associations of actions and input functions of the keyboard 108 and selectable GUI elements of the touch screen display 115. If an association is detected, the AMS application can proceed to step 824 where it can determine if a profile has been identified in step 812 to record the association(s) detected. If a profile has been identified, the associations are recorded/stored in the profile in step 826. If a profile has not been identified in step 812, the AMS application can create a profile in step 828 for recording the detected associations. In the same step, the user can name the newly created profile as desired. The newly created profile can also be associated with one or more gaming software applications in step 830 for future reference. It is noted that in the case of the touch screen display 115, the AMS application records in step 826, each screen shot with the associated actions.

The AMS application can also store in the profile a gaming venue state for each screen shot. The gaming venue state can be a description of a gaming state (e.g., gaming controls for a tank), images of what the gaming venue state looks like (e.g., one or more still images of a tank, or a video of an avatar entering a tank), and/or application programming instructions (API) messages which can be received from the gaming application to enable the AMS application to identify the occurrence of a gaming venue state. The AMS application can be adapted to utilize image processing technology to detect a gaming venue state according to pre-stored images or video clips in the profile. For example, the AMS application can use image processing technology to identify the avatar of the gamer and track what the avatar does as directed by the gamer. For example, if the avatar enters a tank, the image processing technology of the AMS application can detect a gaming venue state in which a screen shot of tank controls would be appropriate for presentation at the touch screen display 115.

Referring back to step 826, once the associations have been recorded in a profile, the AMS application can determine in step 832 whether the accessories (and/or the dongle 202) shown illustratively in FIGS. 2-4 are available for programming. If the AMS application detects that the accessories and/or the dongle 202 are communicatively coupled to the computer 204, the AMS application can proceed to step 834 of FIG. 8 where it submits the profile and its contents for storage in one of the accessories (e.g., the touch screen display 115 shown as tablet 302 in FIGS. 3-4) or the dongle 202 for recording. Alternatively, the AMS application can store the profile in the computing device (which may be an integral part of an accessory or the dongle 202).

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from raw stimulation information captured by the AMS application as will be described below. Selecting button 106 can also cause the AMS application to adapt the GUI 101 to present promotional offers and software updates.

It should be noted that the steps of method 800 in whole or in part can be repeated until a desirable pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 9 depicts a method 900 in which the AMS application can be programmed to recognize unknown accessories so that method 800 can be applied to new accessories. Method 900 can begin with step 902 in which the AMS application detects an unknown accessory such as a new keyboard, tablet, or other type of accessory from an unknown vendor by way of a communicative coupling to a computing device from which the AMS application operates. Assuming in this illustration the unknown accessory is a keyboard, the AMS application in this instance can receive identity information from the keyboard. The identity can be used to search for the keyboard from a local or remote database. Upon detecting an unknown accessory, the AMS application in step 904 can present a depiction of an accessory of similar or same category in response to a user providing direction as to the type of accessory (by selecting for example a drop-down menu). Alternatively, or in combination with the user instructions, the AMS application can determine from the identity information received from the unknown accessory an accessory type.

In step 906 the AMS application can receive instructions describing all or a portion of the input functions of the unknown accessory. These instructions can come from a user who defines each input function individually or responds to inquiries provided by the AMS application, or from a remote database that describes the features of the accessory. The AMS application can for example make an assumption as to the keyboard layout and highlight each key with a proposed function which the user can verify or modify. Once the AMS application has been provided instructions in step 906, the AMS application can create an accessory identity in step 908 which can be defined by the user. In steps 910 and 912, the AMS application can associate and record the accessory instructions with the identity for future recognition of the accessory. In step 914, the AMS application can present a depiction of the new accessory with its identity along with the other selectable accessories in section 117.

Method 900 can provide a means for universal detection and identification of any accessory which can be used to control or manage software applications operating in a computing device.

FIG. 10 depicts a method 1000 for illustrating the operations of the AMS application for either of the configuration shown in FIGS. 3-4. In the configurations of FIGS. 3-4, the AMS application can be operating in whole or in part from the tablet 302, the dongle 202, the gaming console 306, or combinations thereof. For illustration purposes, it is assumed the AMS application operates from the gaming console 306. Method 1000 can begin with the AMS application establishing communications in steps 1002 and 1004 with the gaming console 306 of FIGS. 3-4 and a gaming accessory such as the tablet 302. These steps can represent for example a user starting the AMS application in the gaming console 306 and/or the user inserting at a USB port of the gaming console 302 a connector of a USB cable tethered to the tablet 302. In step 1006, the tablet 302 can in turn provide the AMS application an accessory ID. With the accessory ID, the AMS application can identify in step 1008 a user account associated with the tablet 302. In step 1010, the AMS application can retrieve one or more profiles associated with the user account.

In step 1012, the user can be presented by way of a display coupled to the gaming console 302 the profiles available to the user to choose from. If the user makes a selection, the AMS application proceeds to step 1014 where it retrieves from the selected profiles the association(s) stored therein. If a selection is not made, the AMS application can proceed to step 1016 where it can determine whether a software gaming application (e.g., video game) is operating from the gaming console 302 or whether the gaming console 302 is communicating with the software gaming application by way of a remote system communicatively coupled to the gaming console 302 (e.g., on-line gaming servers presenting World of Warcraft™). If a gaming software application is detected, the AMS application proceeds to step 1017 where it retrieves a profile that matches the gaming application detected and the association(s) contained in the profile. In the present context, association(s) can represent accessory stimulations, navigation, speech, the invocation of other software applications, or macros thereof. The accessory stimulations can be stimulations that are generated by the tablet 302 being used, stimulations from other unrelated accessories (e.g., a keyboard), or combinations thereof.

Figure 11:
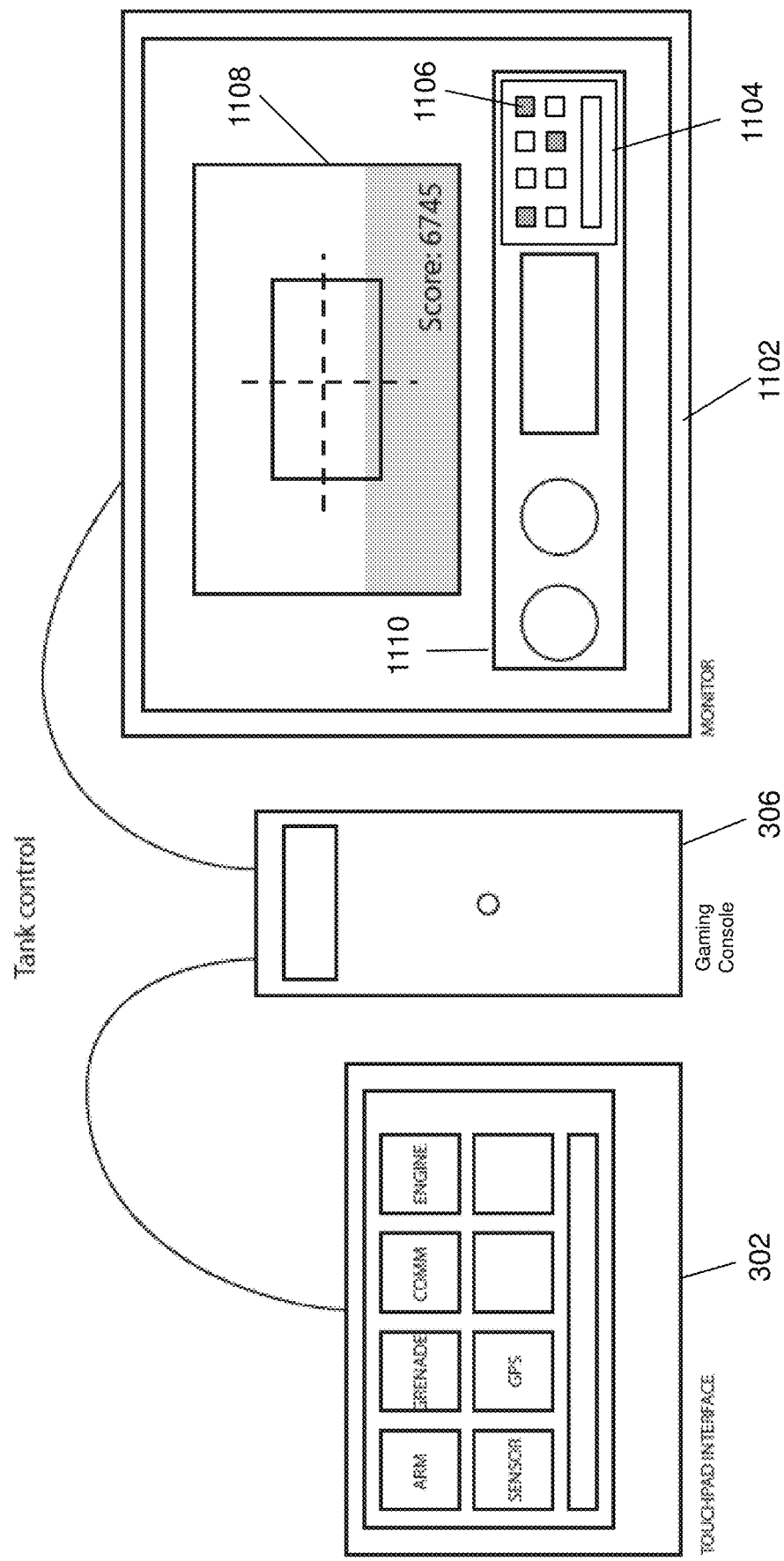
FIGS. 11-12 depict illustrative embodiments of a tablet and gaming console that operates according to the method of FIG. 10.
Figure 12:
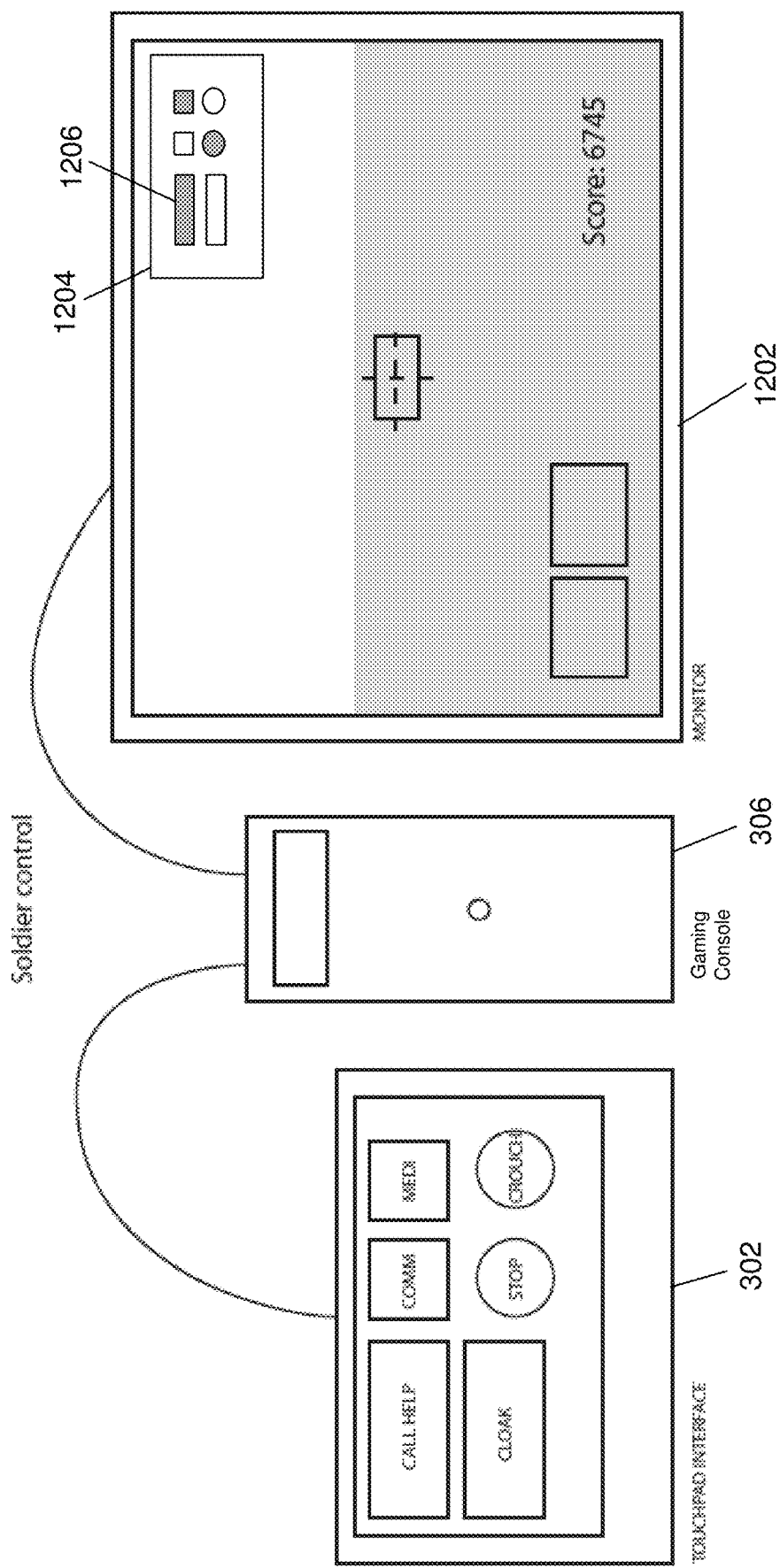

Once a profile and its contents have been retrieved in either of steps 1014 or step 1017, the AMS application can proceed to step 1019 where it monitors for a change in a gaming venue state based on the presentations made by the gaming application. At the start of a game, for example, the gaming venue state can be determined immediately depending on the gaming options chosen by the gamer. The AMS application can determine the gaming venue state by tracking the gaming options chosen, receiving an API instruction from the gaming application, or by performing image processing on the video presentation generated by the gaming application. For example, the AMS application can detect that the gamer has directed an avatar to enter a tank. The AMS application can retrieve in step 1019 a screen shot associated with this gaming venue state as shown in FIG. 11, while the gaming application adjusts the presentation of the game at the monitor 1102 (e.g., view finder 1108 with a control panel 1110). In another illustration, the AMS application can detect a new gaming venue state as a result of that the gamer directing the avatar to leave the tank and travel on foot. Once again the AMS application retrieves in step 1019 a screen shot associated with the detected gaming venue state and presents it at the tablet 302 as shown in FIG. 12. Contemporaneously, the gaming console 306 adjusts the presentation of the game at the monitor 1202 in accordance with the gaming application.

Thus once the gaming venue state is detected in step 1018, the AMS application retrieves in step 1019 the screen shot associated with the detected gaming venue state and presents the screen shot at the tablet 302. The AMS application can then proceed to monitor in step 1020 stimulations generated by the tablet 302. The stimulations can be generated by the gamer by tactile touch of the touch screen GUI element controls of the tablet 302. The AMS application can be adapted to detect a selection of a GUI element presented by the tablet 302 in several ways. For example, the tablet 302 can provide the AMS application information associated with the surface area covered by a gamer's finger using capacitive or resistive sensing technology. The greater the surface area the more the gamer is depressing his/her finger on the touch screen display of the tablet 302. Similarly, the less surface area detected the less the gamer is depressing his/her finger on the tablet 302. Detecting a large surface area or a sudden change in surface area (less to more can be an indicator to the AMS application that the gamer has selected a GUI element. A continuous small surface area can be ignored as a selection thus allowing the gamer to place several fingers on the selectable GUI elements of the tablet 302 without invoking a selection.

To assist the gamer, the AMS application can also be adapted to reserve a portion of a presentation area of a monitor coupled to the gaming console 306 from which the gaming application is presented. In the reserved portion, the AMS application can replicate the screen shot presented by the tablet 302 with an indication of which selectable GUI elements have a finger placed thereon by the gamer. This indication can be shown by coloring the selectable GUI elements that have a finger place on it. FIG. 11 shows a tablet 302 tethered to a gaming console 306, which in turn is tethered to a monitor 1102 from which the gaming application presents the game. In the bottom right corner, a copy of the screen shot 1104 of the tablet 302 is presented with three buttons shaded in gray 1106. The buttons shaded in gray represents buttons that the gamer has placed a finger. This visual aid provides a gamer a means to visualize the game on the monitor 1102 and know the placement of the gamer's fingers on the tablet 302 without the gamer directing his/her eyes to the tablet 302. So long as the gamer lightly places his/her fingers on selectable GUI elements (buttons in the present illustration), the AMS application will not detect that a selection has been made. A similar presentation is shown in FIG. 12. In this illustration the screen shot 1204 of the tablet 302 is at the upper right hand corner with the buttons shaded in gray 1206 based on the detection of finger placement on each button shaded in gray.

In addition to detecting the surface area of a finger placed on the tablet 302, the AMS application can be adapted to detect where the surface area is relative to the selectable GUI elements. If for example, the surface area of the finger is in a location on the tablet 302 between selectable GUI elements, the AMS application can perform predictive and correlation analysis to determine which GUI element is most likely of interest to the gamer. The AMS application can make this determination from a proximity of the detected surface area of the finger placement to one of the selectable GUI elements as well as the context of the game at the time the finger placement is detected. For example, the AMS application can determine that the finger placement is near the fire button and farther from a communication button. The AMS application can also ascertain from the gaming application (via API messages or image processing) that the avatar of the gamer is in the midst of receiving fire from enemy players. If the gamer depresses his/her finger during this time such that a change in surface area is detected (low surface area to high surface area), the AMS application can predict that there's a higher likelihood the gamer is intending to depress the attack button rather than the communication button.

With the enhanced detection schemes described above, if a simulation is detected at step 1020, the AMS application can determine in step 1022 whether to pass the detected stimulation(s) to an Operating System (OS) of the gaming console 306 without alteration in step 1032 or with substitutions in steps 1026-1030. This determination can be made by comparing the detected stimulation(s) to triggers associated with one or more actions in the profile. If the detected stimulation(s) match the stimulations identified as triggers, then the AMS application proceeds to step 1026 where it retrieves substitute stimulation(s) from the triggered action (s) in the profile. In step 1028, the AMS application substitutes the detected stimulation(s) with the substitute stimulations and reports them to the OS of the gaming console 306. If there are no matches detected in step 1022, the AMS application transmits in step 1032 the detected stimulation to the OS of the gaming console 306 without alteration. In step 1034, the OS determines whether to pass the reported stimulations to the gaming software application in step 1036, invoke in step 1038 a software application identified in the stimulation(s) reported in steps 1030 or 1032, or a combination thereof.

Contemporaneous to the embodiments described above, the AMS application can record in step 1040 statistics or raw data relating to the detected accessory stimulations. A portion of the AMS application can operate as a background process which records statistics and/or raw data relating to the stimulations detected. After completing a game, the user can select button 104 in FIG. 1, which causes the AMS application to present an updated GUI such as shown in FIG. 6, which illustrates the usage of input functions of one of the screen shots of the tablet 302 for which stimulations were detected in step 1020 of FIG. 10.

In the illustration of FIG. 6, certain selectable GUI buttons are color-coded to illustrate the frequency of usage of these buttons. A color scale 603 defines the frequency of usage of the input functions of the tablet 302. The first end of the scale (navy blue) represents a single detected depression, while an opposite end of the scale (bright red) represents 500 detected depressions. Based on this scale, the AMS application maps by color stimulations of the selectable GUI elements. For example, the grenade button has the highest detectable usage, while the engine has the fewest depressions. Buttons such as "Sensor" having zero depressions are not color coded to readily identify the color mapping of keys which were used at least once.

The AMS application provides additional functions in a playback panel of the GUI which can help a gamer understand how the color coded keys were used during an active software application such as a video game. In this section of the GUI, the AMS application can present the user with a playback control function 602 which the user can select to replay, pause, forward or rewind the usage of these keys. When usage playback is selected, the user can for instance see the color coded keys highlighted in real-time with a temporary white border to visualize how the keys were selected. A time clock 604 provides the user the elapsed time of the playback sequence. Button 612 allows the user to retrieve statistics from other sessions, while button 614 provides the user a means to save statistics from a given session.

The GUI of FIG. 6 could have been shown as a split screen with all accessories which generated one or more detected stimulations (e.g., keyboard, mouse, and microphone), each providing statistical symbolic results as described above for the keyboard. Although not shown, split screen embodiments are contemplated by the present disclosure for the GUI of FIG. 6.

Figure 7:
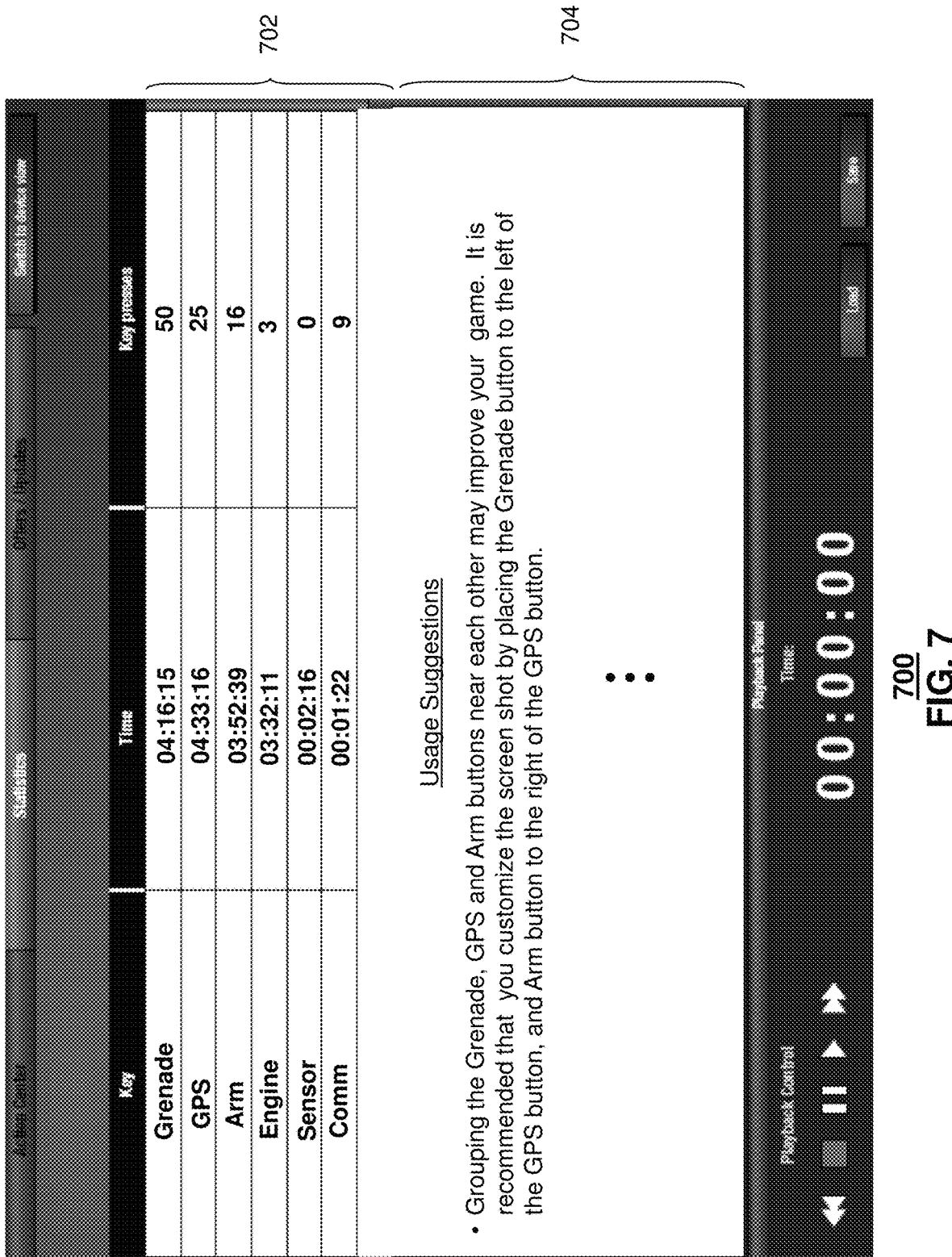

In addition to a symbolic representation as shown in FIG. 6, the AMS application can provide the gamer a means to visualize raw statistics in a table format such as shown in FIG. 7 by selecting button 612. The table format shows raw data in section 702 and possible suggestions in section 704 for improving user performance which can be generated by the AMS application. Section 702 can be presented in a table format with a column identifying the key being analyzed, its usage, and number of key presses. The user can ascertain from this table the most and least frequently used keys as well as other identifiable patterns.

The AMS application can utilize an understanding of the layout of the accessory to determine from the statistics ways that the user can improve response time or ergonomic use. For example, the AMS application can determine from a layout analysis that the selectable GUI elements rearranging the Grenade, GPS and Arm buttons may save the gamer time in execution thereby speed the gamers reactions and improve performance.

The AMS application can utilize present and next generation algorithms to determine how to improve response times and ergonomic usage of accessory devices. The AMS application can for example have at its disposal an understanding of the layout of each accessory, the type of software being controlled by the accessory, type of operations commonly used to control the software (e.g., known actions as shown in the actions column 130 of FIG. 1), an understanding of the associations made by other users (e.g., gamers) to improve their performance when controlling the software, and so on. The AMS application can also be adapted to communicate with the gaming application via an API to receive additional gaming statistics. The AMS application can also utilize statistical and behavior modeling techniques to predict the behavior of the gamer and responses from the software application to identify possible ways to improve the gamer's performance.

From the foregoing descriptions, it would be evident to an artisan with ordinary skill in the art that the aforementioned embodiments can be modified, reduced, or enhanced without departing from the scope and spirit of the claims described below. For example, the AMS application can be integrated in the tablet 302 thereby performing all or a portion of methods 800-1000.

In another embodiment, the AMS application can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory (e.g., the touch screen display 115 or tablet 302. The user can also specify which layer to present in FIG. 1 while associating actions. If for instance layer 1 is shown, the GUI of FIG. 1 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting a layer button on the tablet 302) to switch between layers in a round robin fashion (layer 1→layer 2→layer 3→to layer 1→and so on). Alternatively, the user can define a hold and release trigger to switch between layers. In this embodiment, the user moves to another layer while pressing a button on the tablet 302 and returns to the preceding layer upon its release. In yet another embodiment, the trigger to switch layers can be defined differently per layer. The user can for example select one button in layer 1 to proceed to layer 2, and select a different button in layer 2 to return to layer 1 or proceed to yet another layer 3. There can be numerous combinations of layers and triggers which can be defined to substantially expand the capability of single accessory.

In another embodiment, the AMS application can be adapted so that a gamer can define super macros and/or super profiles. A super macro can represent nested macros (combinations of macros). AMS application can be adapted so that the gamer can customize the timing for executing nested macros. Similarly, a super profile can represent nested profiles (combinations of profiles). A super profile can for example comprise sub-profiles, each sub-profile defining associations of actions to input functions of a particular accessory. The super macros and/or profiles can be programmed into the dongle 202.

In yet another embodiment, the tablet 302 can be equipped with a biometric device such as a fingerprint reader to identify the gamer and thereby provide an identity that describes the gamer and the tablet 302 used thereby. In this embodiment, different users can utilize the same tablet 302 but invoke a different user account depending on the biometric data provided with the accessory ID.

The foregoing embodiments are a subset of possible embodiments contemplated by the present disclosure. Other suitable modifications can be applied to the present disclosure.

FIG. 13 depicts an exemplary diagrammatic representation of a machine in the form of a computer system 1300 within which a set of instructions, when executed, may cause the machine to perform any one or more of the methods discussed above. One or more instances of the machine can operate, for example, as the tablet 302, the gaming console 306 and other devices of FIGS. 2-4.] In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, or a solid state display. The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a memory to store instructions; and
   a processing system including a processor, the processing system being coupled to the memory, wherein the processing system, responsive to executing the instructions, performs operations comprising:
   initiating control of a video game application with a touch screen accessory according to a first programmable layer and according to a first gaming venue state, the first gaming venue state being determined based on a performance of image processing on a first screen shot of a video presentation generated by the video game application; and adjusting the control of the video game application with the touch screen accessory according to a second programmable layer in response to receiving a user-generated input and according to a second gaming venue state that is different from the first gaming venue state, the second gaming venue state being determined based on a performance of image processing on a second screen shot of the video presentation.

2. The device of claim 1, wherein the operations comprise specifying a first trigger to switch from the first programmable layer to the second programmable layer.

3. The device of claim 2, wherein the specifying of the first trigger comprises specifying the first trigger to switch from the first programmable layer to the second programmable layer in response to receiving a second user-generated input.

4. The device of claim 2, wherein the first trigger comprises selecting a button on the touch screen accessory associated with the first programmable layer.

5. The device of claim 2, wherein the operations comprise specifying a second trigger to switch from the second programmable layer to the first programmable layer.

6. The device of claim 5, wherein the specifying of the second trigger comprises specifying the second trigger to switch from the first programmable layer to the second programmable layer in response to receiving a second user-generated input.

7. The device of claim 5, wherein the second trigger comprises selecting a button on the touch screen accessory associated with the second programmable layer.

8. The device of claim 5, wherein the first trigger comprises a hold of a button on the touch screen accessory associated with the first programmable layer, and wherein the second trigger comprises a release of the button.

9. The device of claim 1, wherein the operations comprise:
obtaining statistics associated with the video game application;
identifying a first layout of a plurality of elements according to the statistics, the plurality of elements controlling the video game application; and
specifying the first layout of the plurality of elements to the first programmable layer.

10. A non-transitory, machine-readable computer medium, comprising executable instructions, which responsive to being executed by a processing system including a processor, cause the processing system to perform operations comprising:
detecting a touch screen accessory associated with a video game application;
initiating control of the video game application with the touch screen accessory according to a first programmable layer and according to a first gaming venue state, the first gaming venue state being determined based on a performance of image processing on a first screen shot of a video presentation generated by the video game application; and
adjusting the control of the video game application with the touch screen accessory according to a second programmable layer and according to a second gaming venue state that is different from the first gaming venue state, the second gaming venue state being determined based on a performance of image processing on a second screen shot of the video presentation.

11. The non-transitory, machine-readable computer medium of claim 10, wherein the operations comprise specifying a first trigger to switch from the first programmable layer to the second programmable layer.

12. The non-transitory, machine-readable computer medium of claim 11, wherein the specifying of the first trigger comprises specifying the first trigger to switch from the first programmable layer to the second programmable layer in response to receiving a user-generated input.

13. The non-transitory, machine-readable computer medium of claim 11, wherein the first trigger comprises a selection of a button on the touch screen accessory associated with the first programmable layer.

14. The non-transitory, machine-readable computer medium of claim 11, wherein the operations comprise specifying a second trigger to switch from the second programmable layer to the first programmable layer.

15. The non-transitory, machine-readable computer medium of claim 14, wherein the specifying of the second trigger comprises specifying the first trigger to switch from the first programmable layer to the second programmable layer in response to receiving a user-generated input.

16. The non-transitory, machine-readable computer medium of claim 14, wherein the second trigger comprises a selection of a button on the touch screen accessory associated with the second programmable layer.

17. The non-transitory, machine-readable computer medium of claim 14, wherein the first trigger comprises a hold of a button on the touch screen accessory associated with the first programmable layer, wherein the second trigger comprises a release of the button.

18. A method, comprising:
detecting, by a processing system including a processor, a touch screen accessory associated with a video game application;
determining, by the processing system, a user profile associated with the touch screen accessory;
specifying, by the processing system, a first layout to a first programmable layer in response to receiving a first user-generated input;
obtaining, by the processing system, statistics associated with the video game application;
identifying, by the processing system, a second layout according to the statistics;
specifying, by the processing system, the second layout to a second programmable layer in response to receiving a second user-generated input;
initiating, by the processing system, control of the video game application with the touch screen accessory according to the first programmable layer and according to a first gaming venue state, the first gaming venue state being determined based on a performance of image processing on a first screen shot of a video presentation generated by the video game application; and
adjusting, by the processing system, the control of the video game application with the touch screen accessory according to the second programmable layer in response to receiving a third user-generated input and according to a second gaming venue state that is different from the first gaming venue state, the second gaming venue state being determined based on a performance of image processing on a second screen shot of the video presentation, wherein the third user-generated input indicates a first trigger to switch from the first programmable layer to the second programmable layer.

19. The method of claim 18, comprising specifying, by the processing system, a second trigger to switch from the second programmable layer to the first programmable layer.

20. The method of claim 19, comprising adjusting, by the processing system, the control of the video game application with the touch screen accessory according to the first programmable layer in response to receiving a fourth user-generated input, wherein the fourth user-generated input indicates the second trigger.

* * * * *